(12) United States Patent
Brown et al.

(10) Patent No.: US 10,083,247 B2
(45) Date of Patent: Sep. 25, 2018

(54) GENERATING STATE-DRIVEN ROLE-BASED LANDING PAGES

(75) Inventors: Michael S. Brown, Westminster, CO (US); Chakriya D. Lipps, Aurora, CO (US); Gurbinder S. Bali, Highlands Ranch, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1215 days.

(21) Appl. No.: 13/459,953

(22) Filed: Apr. 30, 2012

(65) Prior Publication Data

US 2013/0086479 A1 Apr. 4, 2013

Related U.S. Application Data

(60) Provisional application No. 61/542,182, filed on Oct. 1, 2011.

(51) Int. Cl.
*G06F 3/01* (2006.01)
*G06F 15/16* (2006.01)
*G06F 17/30* (2006.01)
*G06F 21/62* (2013.01)

(52) U.S. Cl.
CPC .... *G06F 17/30893* (2013.01); *G06F 21/6218* (2013.01)

(58) Field of Classification Search
CPC .................................. G06F 21/31; G06F 21/41
USPC ........................................ 715/741, 743, 745
See application file for complete search history.

(56) References Cited

U.S. PATENT DOCUMENTS

| | | | |
|---|---|---|---|
| 6,191,799 B1 | 2/2001 | Purdy | |
| 6,405,159 B2 | 6/2002 | Bushey | |
| 6,538,635 B1 | 3/2003 | Ringot | |
| 6,544,295 B1 | 4/2003 | Bodnar | |
| 6,944,622 B1 | 9/2005 | Mitchell et al. | |

(Continued)

FOREIGN PATENT DOCUMENTS

WO WO 2012037496 A2 3/2012

OTHER PUBLICATIONS

Non-final Office Action dated May 9, 2013 for related U.S. Appl. No. 13/181,294.

(Continued)

*Primary Examiner* — Daeho D Song
(74) *Attorney, Agent, or Firm* — Vista IP Law Group, LLP

(57) ABSTRACT

A method, computer system, and computer program product for generating state-driven role-based landing pages. An enterprise application user in a secure enterprise application environment provides user-specified content relevant to the user's role in the enterprise, and when the user invokes an enterprise application, initial screens displayed by the enterprise application are displayed as landing pages using the user-specified content. The method commences by validating an enterprise application user using a user profile and a security model where the security model serves to distinguish permitted or allowed enterprise application user activities from denied enterprise application activities. Once validated, then the method identifies a user's role or roles, and further, identifies the user's selection of subscriptions (e.g., subscriptions pertaining to content related to the user's role). Given the user role and the user's selection of subscriptions, systems keep track of user states to use when populating landing pages with subscription content.

20 Claims, 12 Drawing Sheets

(56) References Cited

U.S. PATENT DOCUMENTS

| | | | |
|---|---|---|---|
| 6,968,331 B2 | 11/2005 | Bar-Yossef et al. | |
| 6,980,100 B1 | 12/2005 | Hoben et al. | |
| 7,165,226 B2 | 1/2007 | Thurner et al. | |
| 7,292,844 B2 | 11/2007 | Dowling et al. | |
| 7,293,034 B2 | 11/2007 | Paya et al. | |
| 7,392,255 B1* | 6/2008 | Sholtis | G06F 17/30566 |
| 7,409,710 B1* | 8/2008 | Uchil | H04L 63/08 713/155 |
| 7,434,203 B2 | 10/2008 | Stienhans et al. | |
| 7,561,966 B2 | 7/2009 | Nakamura | |
| 7,730,410 B2* | 6/2010 | Goering | G06F 17/3089 715/707 |
| 7,761,800 B2 | 7/2010 | Chaudhri et al. | |
| 7,788,146 B2 | 8/2010 | McCarthy, Jr. | |
| 7,870,080 B2 | 1/2011 | Budike, Jr. | |
| 7,886,000 B1 | 2/2011 | Polis et al. | |
| 7,890,921 B2 | 2/2011 | Munkvold et al. | |
| 7,945,850 B2 | 5/2011 | Machalek | |
| 8,046,273 B2 | 10/2011 | Welter | |
| 8,245,155 B2 | 8/2012 | Nakajima et al. | |
| 8,302,020 B2 | 10/2012 | Louch et al. | |
| 8,311,942 B1 | 11/2012 | Mason | |
| 8,365,079 B2 | 1/2013 | Kenna et al. | |
| 8,407,576 B1 | 3/2013 | Yin et al. | |
| 8,473,859 B2 | 6/2013 | Chaudhri et al. | |
| 8,719,704 B2* | 5/2014 | Muniswamy | G06F 9/451 715/700 |
| 8,789,205 B2* | 7/2014 | Ramaswamy | G06F 21/604 726/28 |
| 2001/0028364 A1 | 10/2001 | Fredell et al. | |
| 2002/0023122 A1 | 2/2002 | Polizzi | |
| 2002/0161634 A1 | 10/2002 | Kaars | |
| 2002/0188729 A1* | 12/2002 | Zhou | G06F 21/41 709/227 |
| 2003/0140307 A1 | 7/2003 | Bar-Yossef et al. | |
| 2003/0163513 A1* | 8/2003 | Schaeck | G06Q 30/02 709/201 |
| 2004/0093526 A1* | 5/2004 | Hirsch | G06F 21/6218 726/21 |
| 2004/0155907 A1 | 8/2004 | Yamaguchi et al. | |
| 2004/0199541 A1* | 10/2004 | Goldberg | G06Q 10/06 |
| 2004/0199543 A1 | 10/2004 | Braud et al. | |
| 2004/0215740 A1 | 10/2004 | Frank | |
| 2004/0237038 A1 | 11/2004 | Stuhec | |
| 2004/0252134 A1 | 12/2004 | Bhatt | |
| 2005/0027574 A1 | 2/2005 | Agrawal et al. | |
| 2005/0044015 A1* | 2/2005 | Bracken | G06Q 20/04 705/30 |
| 2005/0102154 A1* | 5/2005 | Dodd | G06Q 10/06 705/7.32 |
| 2005/0138118 A1* | 6/2005 | Banatwala | G06Q 10/10 709/204 |
| 2005/0177507 A1 | 8/2005 | Bandych et al. | |
| 2005/0267789 A1* | 12/2005 | Satyadas | G06Q 10/06 705/7.12 |
| 2005/0283734 A1 | 12/2005 | Santoro et al. | |
| 2006/0026033 A1* | 2/2006 | Brydon | G06Q 10/063 705/7.11 |
| 2006/0031849 A1 | 2/2006 | Barta et al. | |
| 2006/0047419 A1* | 3/2006 | Diendorf | G01C 21/26 701/532 |
| 2006/0184882 A1 | 8/2006 | Molander et al. | |
| 2006/0184883 A1 | 8/2006 | Jerrard-Dunne et al. | |
| 2006/0195779 A1 | 8/2006 | McElroy et al. | |
| 2006/0224951 A1 | 10/2006 | Burke et al. | |
| 2006/0248475 A1 | 11/2006 | Abrahamsson | |
| 2006/0277089 A1 | 12/2006 | Hubbard et al. | |
| 2007/0016514 A1* | 1/2007 | Al-Abdulqader | G06Q 10/06 705/37 |
| 2007/0038934 A1 | 2/2007 | Fellman | |
| 2007/0044039 A1 | 2/2007 | Amadio et al. | |
| 2007/0101279 A1 | 5/2007 | Chaudhri et al. | |
| 2007/0101291 A1 | 5/2007 | Forstall et al. | |
| 2007/0101297 A1 | 5/2007 | Forstall et al. | |
| 2007/0106952 A1 | 5/2007 | Matas et al. | |
| 2007/0118446 A1 | 5/2007 | Soehngen | |
| 2007/0118813 A1 | 5/2007 | Forstall et al. | |
| 2007/0150480 A1* | 6/2007 | Hwang | G06Q 10/00 |
| 2007/0162562 A1 | 7/2007 | Kwon et al. | |
| 2007/0194902 A1 | 8/2007 | Blanco | |
| 2007/0203984 A2 | 8/2007 | AlHusseini et al. | |
| 2007/0208713 A1* | 9/2007 | Krishnaprasad | G06F 17/30286 |
| 2007/0208714 A1* | 9/2007 | Ture | G06F 17/3064 |
| 2007/0208734 A1* | 9/2007 | Koide | G06F 21/41 |
| 2007/0208744 A1* | 9/2007 | Krishnaprasad | G06F 21/6227 |
| 2007/0208745 A1* | 9/2007 | Ture | G06F 21/6227 |
| 2007/0208746 A1* | 9/2007 | Koide | G06F 21/6218 |
| 2007/0208755 A1* | 9/2007 | Bhatkar | G06F 21/31 |
| 2007/0209080 A1* | 9/2007 | Ture | G06F 17/30864 726/28 |
| 2007/0214129 A1* | 9/2007 | Ture | G06F 17/30864 |
| 2007/0220268 A1* | 9/2007 | Krishnaprasad | G06F 17/30427 713/182 |
| 2007/0233681 A1* | 10/2007 | Ronen | G06F 8/71 |
| 2007/0240063 A1 | 10/2007 | Cheng et al. | |
| 2007/0255653 A1 | 11/2007 | Tumminaro et al. | |
| 2007/0266093 A1 | 11/2007 | Forstall et al. | |
| 2007/0283425 A1* | 12/2007 | Ture | G06F 17/30864 726/5 |
| 2008/0040704 A1 | 2/2008 | Khodabandehloo et al. | |
| 2008/0043020 A1 | 2/2008 | Snow | |
| 2008/0046834 A1* | 2/2008 | Yu | G06Q 10/06316 715/771 |
| 2008/0077980 A1 | 3/2008 | Meyer et al. | |
| 2008/0092039 A1 | 4/2008 | Brockway et al. | |
| 2008/0097906 A1 | 4/2008 | Williams et al. | |
| 2008/0120129 A1 | 5/2008 | Seubert | |
| 2008/0123536 A1* | 5/2008 | Johnson | H04L 41/12 370/241 |
| 2008/0165133 A1 | 7/2008 | Blumenberg et al. | |
| 2008/0168367 A1 | 7/2008 | Chaudhri et al. | |
| 2008/0168391 A1 | 7/2008 | Robbin et al. | |
| 2008/0229112 A1 | 9/2008 | Yamauchi | |
| 2008/0250349 A1 | 10/2008 | Peiro et al. | |
| 2008/0263216 A1 | 10/2008 | Jacob | |
| 2008/0270948 A1* | 10/2008 | Lazzaro | G06F 3/0482 715/854 |
| 2009/0006997 A1 | 1/2009 | Jiang et al. | |
| 2009/0024944 A1 | 1/2009 | Louch et al. | |
| 2009/0063990 A1 | 3/2009 | Morris et al. | |
| 2009/0070409 A1 | 3/2009 | Clayton et al. | |
| 2009/0070698 A1 | 3/2009 | Shurtleff | |
| 2009/0100377 A1 | 4/2009 | Miyamoto et al. | |
| 2009/0113310 A1 | 4/2009 | Appleyard et al. | |
| 2009/0158190 A1 | 6/2009 | Higginson | |
| 2009/0182800 A1 | 7/2009 | Lin et al. | |
| 2009/0187654 A1* | 7/2009 | Raja | H04L 63/0272 709/224 |
| 2009/0222720 A1 | 9/2009 | Drieschner | |
| 2009/0222738 A1 | 9/2009 | Drieschner | |
| 2009/0228824 A1 | 9/2009 | Forstall et al. | |
| 2009/0254825 A1 | 10/2009 | Sichart et al. | |
| 2009/0254865 A1 | 10/2009 | Siegel | |
| 2009/0276840 A1* | 11/2009 | Cao | H04L 9/3213 726/9 |
| 2010/0017616 A1 | 1/2010 | Nichols et al. | |
| 2010/0023874 A1 | 1/2010 | Frohwein | |
| 2010/0042635 A1* | 2/2010 | Venkataramanujam | G06F 17/3089 707/709 |
| 2010/0058438 A1 | 3/2010 | Rajaram | |
| 2010/0107115 A1 | 4/2010 | Sareen et al. | |
| 2010/0138295 A1 | 6/2010 | Caron et al. | |
| 2010/0138316 A1 | 6/2010 | Connors et al. | |
| 2010/0138474 A1* | 6/2010 | Harkins | G06Q 10/06 709/203 |
| 2010/0138534 A1* | 6/2010 | Mutnuru | H04L 43/0817 709/224 |
| 2010/0138734 A1 | 6/2010 | Braud et al. | |
| 2010/0153515 A1 | 6/2010 | Lau et al. | |
| 2010/0169301 A1 | 7/2010 | Rubanovich et al. | |
| 2010/0169792 A1 | 7/2010 | Ascar et al. | |

(56) References Cited

U.S. PATENT DOCUMENTS

| | | | |
|---|---|---|---|
| 2010/0198649 A1 | 8/2010 | Applehard et al. | |
| 2010/0250386 A1 | 9/2010 | Liu et al. | |
| 2010/0281374 A1 | 11/2010 | Schulz et al. | |
| 2010/0287570 A1* | 11/2010 | Mock | G06Q 10/06 719/328 |
| 2010/0332360 A1 | 12/2010 | Nowotny | |
| 2011/0251949 A1 | 10/2011 | Kay et al. | |
| 2011/0261049 A1* | 10/2011 | Cardno | G06Q 10/10 345/419 |
| 2011/0277027 A1* | 11/2011 | Hayton | H04L 63/0815 726/8 |
| 2011/0283209 A1 | 11/2011 | Levin et al. | |
| 2012/0005659 A1 | 1/2012 | Bonanno | |
| 2012/0011594 A1* | 1/2012 | Nguyen | G06F 21/6218 726/28 |
| 2012/0023554 A1* | 1/2012 | Murgia | H04L 63/102 726/4 |
| 2012/0166178 A1* | 6/2012 | Latzina | G06F 17/27 704/9 |
| 2012/0172026 A1 | 7/2012 | Kwon et al. | |
| 2012/0323953 A1 | 12/2012 | Ortega et al. | |
| 2013/0046704 A1* | 2/2013 | Patwa | G06Q 10/06 705/321 |
| 2013/0067115 A1 | 3/2013 | Lapanc | |
| 2013/0086101 A1* | 4/2013 | Heidasch | G06F 17/30528 707/769 |
| 2013/0117652 A1 | 5/2013 | Folsom | |

OTHER PUBLICATIONS

Final Office Action dated Nov. 7, 2013 for related U.S. Appl. No. 13/181,294.
Non-final Office Action dated Jun. 17, 2014 for related U.S. Appl. No. 13/181,294.
Final Office Action dated Dec. 18, 2014 for related U.S. Appl. No. 13/181,294.
Non-final Office Action dated Jun. 4, 2013 for related U.S. Appl. No. 13/235,621.
Final Office Action dated Jan. 3, 2014 for related U.S. Appl. No. 13/235,621.
Non-final Office Action dated Apr. 23, 2014 for related U.S. Appl. No. 13/235,621.
Final Office Action dated Oct. 6, 2014 for related U.S. Appl. No. 13/235,621.
Advisory Action dated Dec. 19, 2014 for related U.S. Appl. No. 13/235,621.
Non-final Office Action dated Apr. 10, 2013 for related U.S. Appl. No. 13/234,362.
Final Office Action dated Nov. 4, 2013 for related U.S. Appl. No. 13/234,362.
Non-final Office Action dated Apr. 9, 2014 for related U.S. Appl. No. 13/234,362.
Final Office Action dated Aug. 12, 2014 for related U.S. Appl. No. 13/234,362.
Advisory Action dated Dec. 3, 2014 for related U.S. Appl. No. 13/234,362.
International Search Report and Written Opinion dated Jun. 25, 2012 for PCT/US2011/051999, 11 pages.
Google Accounts—obtained at https://www.google.com/accounts/ServiceLogin?service=datasummary&passive=900&continue=https://www.google.com/dashboard/&followup=https://www.google.com/dashboard/; Jun. 23, 2011; 1 page.
MSN Home Page—obtained at http://www.msn.com; Apr. 8, 2011; 3 pages.
PointCast (dotcom); obtained from Wikipedia http://en.wikipedia.org/wiki/PointCast_%28dotcom%29; Jul. 12, 2011, 3 pages.
Oracle Peoplesoft Enterprise, PeopleTools 8.51 PeopleBook: People Tools Portal Technologies, Aug. 2010, XP-055026844, pp. i-iv, 25-26, 476-503.
Non-final Office Action dated Mar. 17, 2015, for related U.S. Appl. No. 13/234,362.
Non-final Office Action dated Apr. 28, 2015, for related U.S. Appl. No. 13/181,294.
Final Office Action dated Oct. 22, 2015, for related U.S. Appl. No. 13/181,294.
Non-final Office Action dated Nov. 12, 2015, for related U.S. Appl. No. 13/235,621.
Final Office Action dated Oct. 23, 2015, for related U.S. Appl. No. 13/234,362.
Advisory Action dated Feb. 5, 2016, for related U.S. Appl. No. 13/181,294.
Final Office Action dated Apr. 27, 2016 for related U.S. Appl. No. 13/235,621.
Non-final Office Action dated Jul. 6, 2016 for related U.S. Appl. No. 13/234,362.

* cited by examiner

GENERATING STATE-DRIVEN ROLE-BASED LANDING PAGES

RELATED APPLICATIONS

The present application claims the benefit of priority to U.S. Provisional Patent Application Ser. No. 61/542,182 filed Oct. 1, 2011, entitled "VALUE-ADDED USER-SPECIFIC LANDING PAGES" which is hereby incorporated by reference in its entirety; and certain aspects in some embodiments of the present application are related to material disclosed in U.S. patent application Ser. No. 13/181,294, entitled "AGGREGATING MULTIPLE INFORMATION SOURCES" which was filed on Jul. 12, 2011, the content of which is incorporated by reference in entirety in this Application; and certain aspects in some embodiments of the present application are related to material disclosed in U.S. patent application Ser. No. 13/235,621, entitled "BUSINESS PROCESS VISUALIZATION" which was filed on Sep. 19, 2011, the content of which is incorporated by reference in entirety in this Application; and certain aspects in some embodiments of the present application are related to material disclosed in U.S. patent application Ser. No. 13/234,362, entitled "ENTERPRISE APPLICATION WORKCENTER" which was filed on Sep. 16, 2011, the content of which is incorporated by reference in entirety in this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of enterprise applications and more particularly to techniques for generating state-driven, role-based landing pages.

BACKGROUND

Enterprise applications often support a single entry point to an application (e.g., a landing page), which is often presented as a web page, which web page is possibly retrieved from a web URL having some relevant content.

An enterprise application user will often "start up" or otherwise access an application on many occasions during some time period, and the content might change during that time period. Accordingly, the content displayed on a landing page should also change as time progresses. Still more, the state (or last state) of each successive access by a user might change during ongoing use of the enterprise application, and the content displayed on any re-presentation of a landing page should also change based on the last or current state. Unfortunately, legacy implementations of landing pages do not track user behaviors and are therefore unable to dynamically present landing pages based on the user's behaviors. Nor does there exist an underlying framework available to allow the end user or end user administrative team to conveniently configure and publish landing page content to users. Thus there is a need for users to avail themselves of system(s) capable to generate state-driven role-based landing pages.

SUMMARY

The present disclosure provides an improved method, system, and computer program product suited to address the aforementioned issues with legacy approaches. More specifically, the present disclosure provides a detailed description of techniques used in methods, systems, and computer program products for generating state-driven role-based landing pages.

Disclosed herein are techniques for generating state-driven role-based landing pages. An enterprise application user in a secure enterprise application environment provides user-specified content relevant to the user's role in the enterprise, and when the user invokes an enterprise application, initial screens displayed by the enterprise application are displayed as landing pages using the user-specified content. The method commences by validating an enterprise application user using a user profile and a security model where the security model serves to distinguish permitted or allowed enterprise application user activities from denied enterprise application activities. Once validated, then the method identifies a user's role or roles, and further, identifies the user's selection of subscriptions (e.g., subscriptions pertaining to content related to the user's role). Given the user role and the user's selection of subscriptions, then keeping track of user states to use when populating landing pages with subscription content.

Also, disclosed herein are embodiments used in an enterprise application environment, and where a user subscribes to content relevant to the user's role in the enterprise. When the user invokes an enterprise application, the initial screens displayed by the enterprise application are displayed as landing pages using the subscribed-to content. The method commences by validating an enterprise application user using a user profile and a security model where the security model serves to distinguish permitted or allowed enterprise application user activities from denied enterprise application activities. Once validated, the method identifies a user's role or roles, and further, identifies the user's selection of subscriptions (e.g., subscriptions pertaining to content related to the user's role). Given the user's role and the user's selection of subscriptions (if any), embodiments keep track of user states to use when populating landing pages with subscription content.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
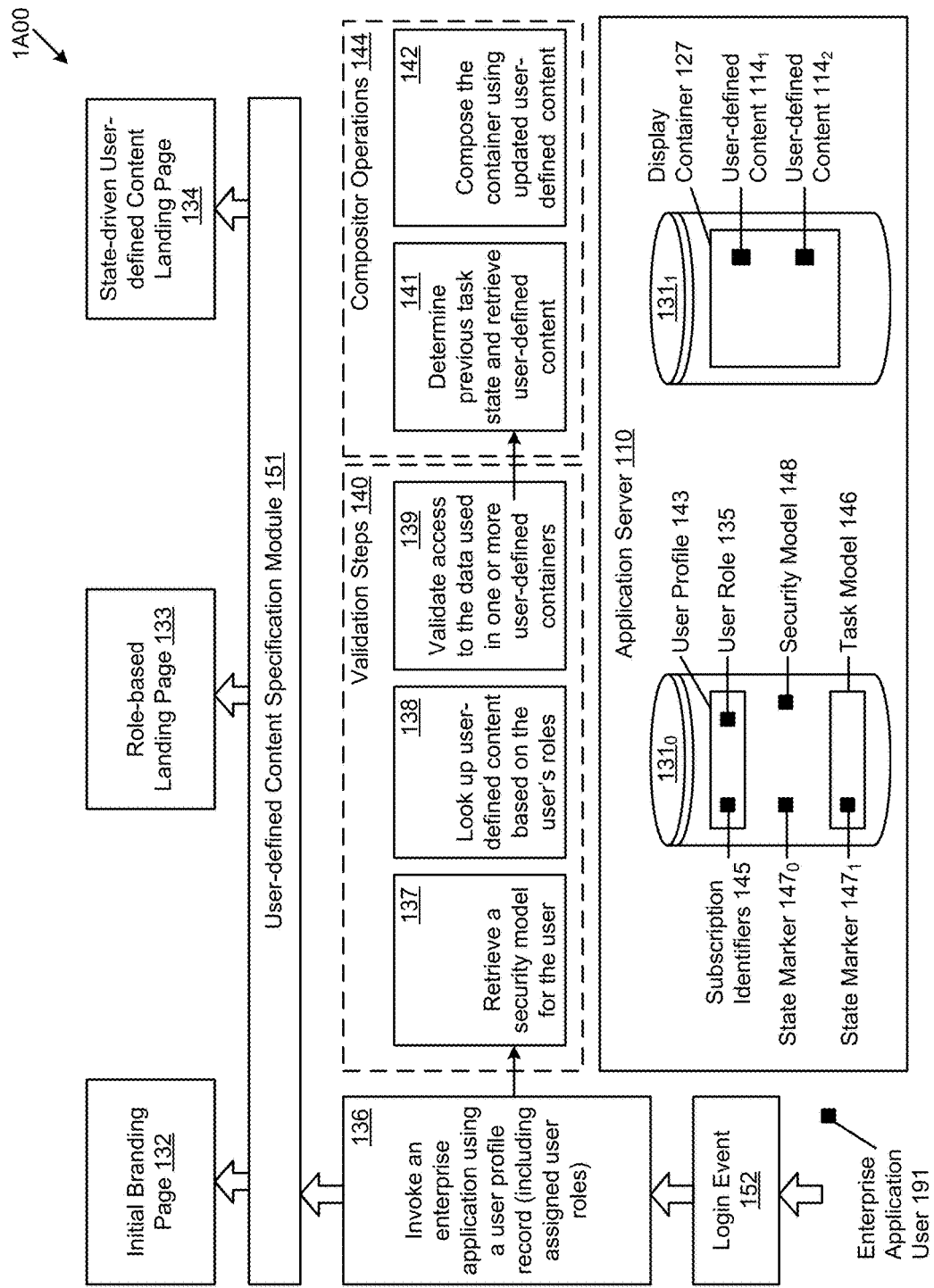
FIG. 1A depicts a system for generating state-driven role-based landing pages, according to some embodiments.

Some embodiments of the present disclosure are directed to an improved approach for generating state-driven role-based landing pages.

Overview

An enterprise application (e.g., an enterprise application running in conjunction with a WAN or LAN) often has an initial entry point such as a landing page, and in some cases the landing page offers value by providing information that is useful to the enterprise application user. As technology has evolved so has the need to configure content for users that is relevant to a particular user or relevant to a particular user's role within the application or organization. Such configured content might further include content that is not only relevant, but also up-to-the-minute current. Still further, relevance might be suggested by a user via reference to a subscription. For example, a user (e.g., a human user, or an automated agent) might subscribe to company "News" posts, updated presentations of data and/or charts, workflow tasks, or even external content. Configuring such content can be addressed through use of a framework, the framework allowing for user configuration of subscriptions, user configuration of content definition, and user-directed content manipulation. A user or administrator might further prepare content publishing such that the configured, relevant content can be accessed from within the enterprise application, for example, from one or more landing pages produced by modules within the enterprise environment. Examples of such content are described as follows:

Branding Content: In some cases, the content type is primarily relevant to aspects of branding. Branding content can be used in conjunction with any type of content. In other cases, a landing page can include substantially only branding content (see FIG. 2A), or branding content can be composed together with other content.

Role-based Content: Uses of role-based content includes techniques to display content to a user based on the user's user profile (e.g., a profile accessed once a valid login has been established). In exemplary cases, a security model is applied to a validated logic such that one or more repositories for content (e.g., from a path such as "user/role/*public") is accessed (in accordance with the security model) to retrieve content to be composited into display containers (e.g., a window, a page, a frame, etc.) used within the enterprise application. In some embodiments observing role-based content, content is retrieved from multiple repositories (e.g., from file system hierarchies such as "user/role/content.htm" or "*public"), and one or more of the multiple repositories includes accesses to role-specific content. For example, an enterprise application user might be assigned to the role of "database administrator", or "account manager", or such other designation that serves to describe one or more roles that correspond to a particular user. Role-based content is accessed based on an assigned role. Strictly as an example, role-based content might include population of menu items, which menu items correspond to tasks applicable to the particular role. As another example, role-based content might include up-to-the-minute content such as data and/or graphs, which data and/or graphs correspond to information applicable to the particular role (see FIG. 3A).

External Content: External content can be accessed using URIs or fully or non-fully qualified URL's to internal or external websites. Strictly as an example, external content might refer to content intended for a wide audience such as an event flyer or an advertisement (see FIG. 3C).

In some cases, the framework combines two or more of the aforementioned content types, and the framework detects the format or formats used to represent the content (e.g., html, javascript, stylesheets, images, etc.). Exemplary embodiments serve to aid the user in management of content by retrieving any two or more of the aforementioned content types, composing the content into pages for the user, and then displaying the composited content in one or more tab-accessible display containers. Given a display container having such tabs, the tabs can then be used to access the content corresponding to each tab, which content may itself comprise one or more further tabs, and so on. In some embodiments, a compositor module is used to access a web "portlet", which web portlet returns subscription content (e.g., news posts, updated presentations of data and/or charts, workflow tasks, external content, web page frames, etc.). In some embodiments, a tab is used to access a web portlet.

Descriptions of Exemplary Embodiments

FIG. 1A depicts a system 1A00 for generating state-driven role-based landing pages. As an option, the present system 1A00 may be implemented in the context of the architecture and functionality of the embodiments described herein. Also, the system 1A00 or any aspect therein may be implemented in any desired environment.

As shown, system 1A00 implements structures and methods in an environment for generating state-driven role-based landing pages. In an exemplary use model, a user (e.g., an enterprise application user 191) invokes an enterprise application (see operation 136) possibly using a login credential (e.g., a user name and a password), and the login credential serves to uniquely identify a user profile (e.g., user profile 143) associated with the enterprise application user 191. Upon invocation, the enterprise application displays an initial landing page (e.g., initial branding page 132, as shown). In some embodiments, the display of the initial landing page persists on the screen for some time duration while the enterprise system performs additional steps to determine aspects of the user's stored state (e.g., using a state marker $147_0$) and to determine aspects of the user's environment and subscriptions (e.g., subscription identifiers 145). After determining at least some aspects of the user's store state, the system 1A00 can render additional forms or instances of a landing page (e.g., initial branding page 132, a role-based landing page 133, or a state-driven user-defined content landing page 134). In some situations, an initial landing page (or other subsequent landing pages) is presented to the user based on an association with a particular environment (e.g., test environment, production environment, demo environment, etc.).

Some of the foregoing steps include validating the user, possibly also validating a user profile such that the enterprise application user can begin to safely use the enterprise application in accordance with access rules (e.g., in accordance with a security model 148) after a successful login event 152 (e.g., in which there is at least some access granted). A given user can be associated with an application server 110. In some enterprise settings, many users are supported by the enterprise environment, and a given user can be associated with more than one application server 110, which application servers can include volatile or non-volatile forms of application storage (e.g., application storage $131_0$, application storage $131_1$). Some of the foregoing steps include retrieving (e.g., from an instance of application storage) and possibly validating a security model (see operation 137 and operation 139) to distinguish allowed enterprise application user activities from denied activities. For example, an enterprise application user 191 might be assigned to a "power role" such as a database administrator, or an enterprise application user 191 might be assigned to a subordinate role such as a clerk or data entry person. Such a role (e.g., user role 135) can be assigned to a particular user, or in some cases a user can assume multiple roles. Some enterprise settings include processing to distinguish allowed enterprise application user activities from denied activities even when the user takes on multiple roles. For example, the user might be granted all allowed enterprise application user activities for any of the aforementioned multiple roles.

The role or roles assigned to a particular user can be determined from a table or relation or file or other data structure (see FIG. 1B, infra) and such a data structure can comprise a relationship between a user and a role and/or a user and a role and a user-defined content 114 (e.g., user-defined content $114_1$, user-defined content $114_2$) and/or a user-defined content specification, etc. Thus, the operation to look up user-defined content specifications based on the user's role or roles (see operation 138) serves to identify a user role and then, based on the identified role, to determine one or more user-defined content specifications based on the identified role. Further examples of identifying a user-defined content specification based on the user role are given in the discussion of FIG. 1B. In some embodiments of system 1A00, access to, and the up-to-date nature of the content associated with a user-defined content specification, is validated (see operation 139). Any one or more of the validating steps (e.g., operation 137, operation 138, operation 139) can be amalgamated into a subroutine or method or web service or validation steps 140 for validating an enterprise application user login event, and for accessing a security model, and further for distinguishing allowed enterprise application user activities from denied enterprise application activities, which user activities can be based on a user's role.

Given a user and the user's role, at least some role-base content can be presented (see role-based landing page 133). Further, in exemplary embodiments, a role comprises certain tasks, any of which tasks may progress in a sequence or flow, and the progression through a sequence or flow can be codified in a task model 146, which task model can be monitored, and any progression, events, or states can be persisted (e.g., using a state marker $147_0$, or state marker $147_1$). Such a state can in turn be used in combination with subscribed-to content when generating state-driven role-based landing pages.

Continuing the discussion of the structure and operations of system 1A00 for generating state-driven role-based landing pages, the system progresses to compositor operations 144. Specifically, the system uses user-defined specifications of content (e.g., which user-defined specifications are possibly codified using a user-defined content specification module 151) and determines a state (e.g., previous task state, previous window state, etc.) based on the user role and based on the user's progression through the aforementioned tasks (see operation 141). In one possible scenario, a user's progression through tasks is monitored and stored periodically (e.g., at task boundaries) and such a persisted state can be used to retrieve additional or updated user-defined content (again, see operation 141). For example, a user carrying out tasks associated with the role of "Account Manager" might need to check on inventory levels on a regular, recurring basis, and might also need to check on order fulfillment on a different recurring basis. The state (e.g., a timestamp) can be persisted so that reports for inventory levels and reports for order fulfillment are updated as often as are needed, but not more often than needed. Having a state (for example, but not necessarily a state in the form of a timestamp) and updated user-defined content (e.g., an updated order fulfillment report), certain compositor operations serve to compose user-defined display containers (e.g., display container 127) using the updated user-defined content (see operation 142). Of course, the steps of operation 142 can be repeated at a second time (and at a third time, etc.), and the user-defined content is again updated with content that is deemed available at the second time (and the third time, etc.).

Figure 1B:
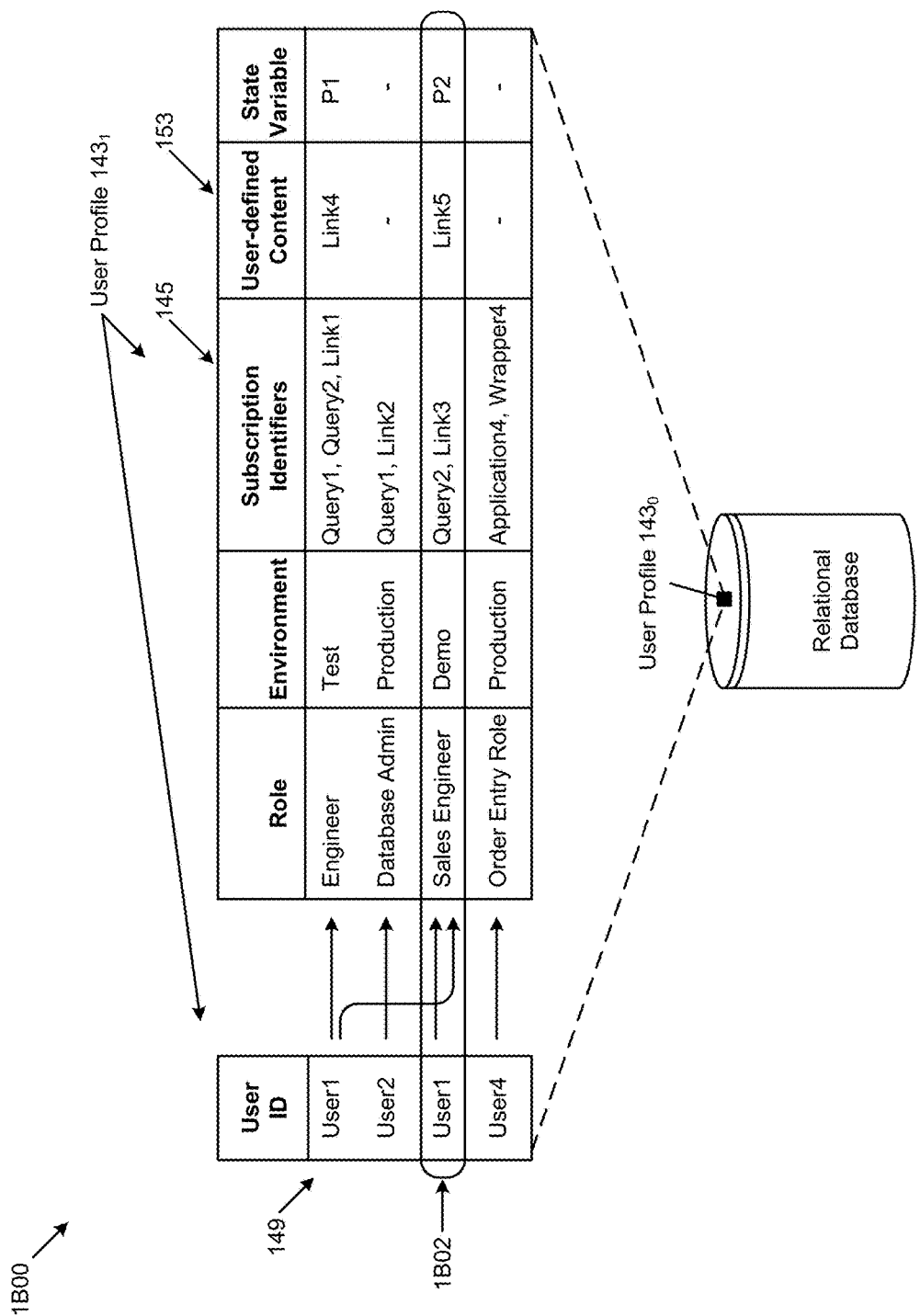
FIG. 1B illustrates a data structure generating state-driven role-based landing pages, according to some embodiments.

FIG. 1B illustrates a data structure 1B00 generating state-driven role-based landing pages. As an option, the present data structure 1B00 may be implemented in the context of the architecture and functionality of the embodiments described herein. Also, the data structure 1B00 or any aspect therein may be implemented in any desired environment.

As shown, the data structure 1B00 is organized as a user profile 143 in the form of a table (e.g., user profile $143_1$). However, other embodiments of data structure 1B00 are reasonable and envisioned, including a user profile 143 represented in a relation stored in a relational database (e.g., user profile $143_0$), or an object in an object-oriented language, or an array, etc. In the table embodiment, a user (e.g., User1, User2, etc.) is associated with a role (e.g., an engineer, a database administrator, a sales engineer, or an order entry role). In some cases, a single user (e.g., User1) is associated with a plurality of roles. As shown, User1 is associated with two rows, one row lists the role of "Engineer", and another row lists the role of "Sales Engineer" (see row 1B02). Also, a user can take on an association with a particular environment (e.g., test environment, production environment, demo environment, etc.). Further, in some embodiments the data structure 1B00 is organized for mapping a user's identification to a portion of the data structure that identifies one or more user roles. In this embodiment, the user role is determined based on a portion of the user profile containing a user identifier (e.g., User ID 149). As shown, it is possible that a single user ID is mapped to multiple roles, and in such a case, known techniques are used to reconcile the multiple mapping. Strictly as an example, if a single user ID is mapped to the role "engineer" as well as to the role "sales engineer", then the reconciliation might include applying a hierarchy rule or precedence rule.

A given user with an associated role can further take on an association with any number of subscriptions. A subscription can be codified as one or more subscription identifiers 145. In turn, a subscription identifier can refer to or capture a subscription query, a report, a link, an application (e.g., an enterprise application), or a subscription wrapper. In the case that the subscription identifier refers to an application, the identified application is run, and the results of running an enterprise application can be used to populate any portion(s) of a landing page. Similarly, in the case of a subscription wrapper, running the identified subscription wrapper causes an enterprise application to be run with the specific input and output configuration as defined in the subscription wrapper, and the results of running the subscription wrapper can be used to populate any portions of a landing page.

In addition to the aforementioned subscriptions, a user can specify his/her own content using the user-defined content field 153. Such a user-defined content field can comprise a link to content. Further, user-defined content can be captured in files located in a directory named by a link, path, URL, or URI. One such path is a default path termed the user's home path. The files at the user's home path can comprise user-defined content in the form of html, javascript, stylesheets, images etc. In some embodiments, the files at the user's home path can comprise an archive of content in the form of a .zip or .jar, or other archive.

In addition to the aforementioned user-defined content field, a user profile 143 can comprise state variables (e.g., state variable P1, state variable P2). In exemplary embodiments user states can be codified into state variables and stored in a user profile (as shown) however, states or state variables (e.g., pointers to states or other state variables) can be stored anywhere, including in volatile as well as in non-volatile storage.

Figure 1C:
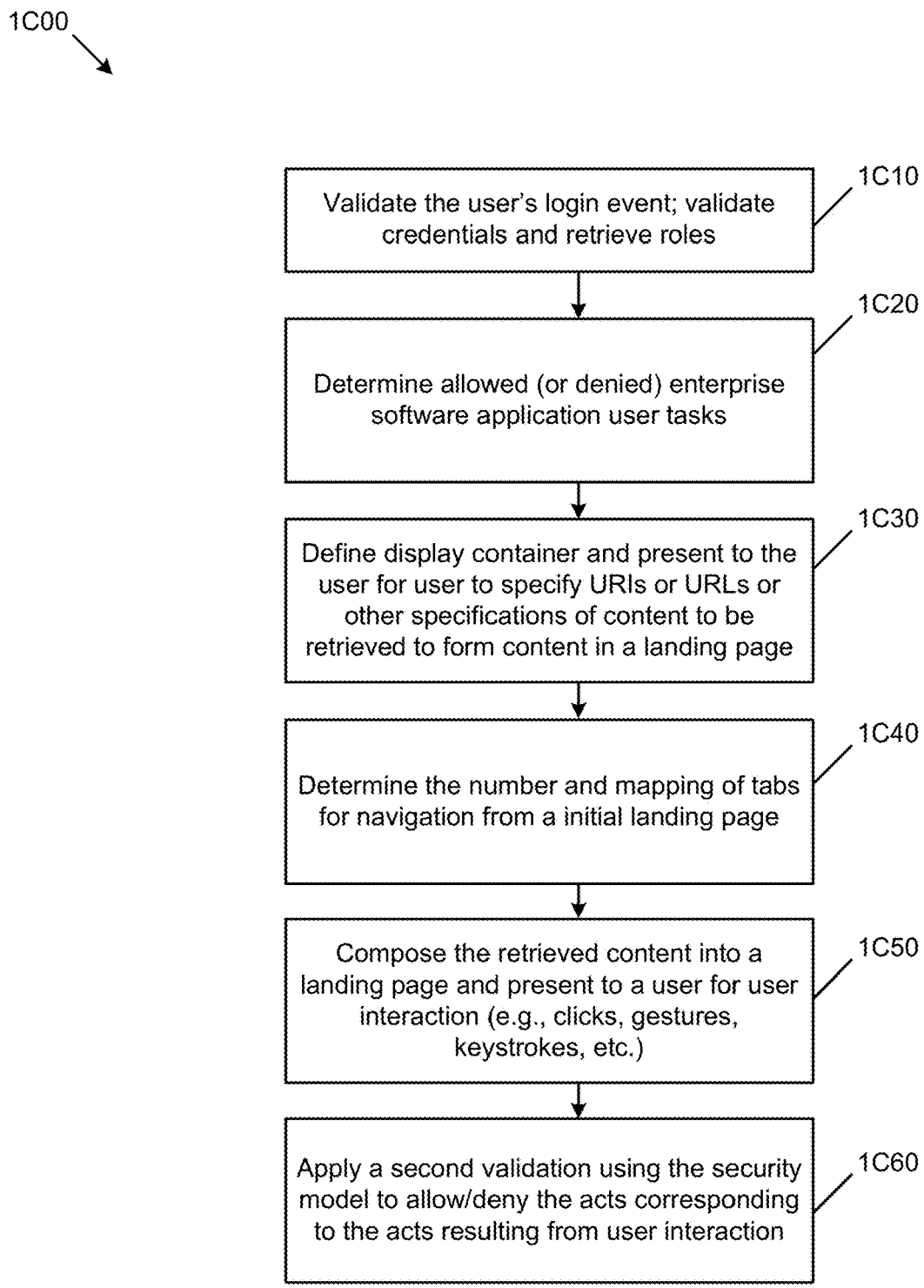
FIG. 1C is a flow chart of a system for generating state-driven role-based landing pages, according to some embodiments.

FIG. 1C is a flow chart of a system 1C00 for generating state-driven role-based landing pages. As an option, the present system 1C00 may be implemented in the context of the architecture and functionality of the embodiments described herein. Also, the system 1C00 or any aspect therein may be implemented in any desired environment.

As shown, the flow chart depicts a computer-implemented method for presenting landing pages to a user within an enterprise software application. Selected steps of this embodiment include:

Validating an enterprise software application user login event (see operation 1C10). In exemplary cases, the validating uses a security model to distinguish allowed enterprise software application user tasks from denied enterprise software application tasks.

Identifying the user role of the application user. As shown, at least one user role can be determined based on the security model. The security model may further distinguish allowed enterprise software application user tasks from denied enterprise software application user tasks; for example, some accesses might be allowed, or some accesses might be denied (see operation 1C20).

Defining and presenting a display container to the user (see operation 1C30). The user can then specify URIs or URLs or other specifications of content. The security model may be invoked in this step to confirm that the user has role-based access to the specified content. And, in some cases, the display container is presented to the user comprising user-specified HTML (e.g., retrieved using the user-specified URLs or other specifications of content). In some cases, the specified URIs or URLs or other specifications of content refer to an application such that following the link would invoke the launch of an application (e.g., an enterprise application task interface).

In certain settings, the above techniques are further augmented by operations to upload, test, approve, activate, and publish the display container. In this manner, while the user can express user-defined content, there exists a series of support steps that serve to ensure quality of service.

In some cases, the presentation of the display container comprises a URL that is external to a network domain of a host of the enterprise software application. In other cases, a user-specified content item might comprise any content published to the user's "user/role/*public" path, and the security model is applied to whatever content is accessed and displayed in the display container provided.

In some situations, the user-defined content might become extensive, and embodiments can manage a large amount or large number of URIs or URLs by populating a plurality of tabs within the display container (see operation 1C40). It is possible that populating the contents of a display container comprises running an application (e.g., via a URI) and populating the display container (e.g., a display container under a tab) with the results of running an enterprise application (see operation 1C50).

At some future moment the user can interact with the presentation display container (e.g., an initial landing page) and the system underlying the display container serves to accept a user indication (e.g., a click, a keystroke, a swipe, etc.) from within the presented display container to invoke the launch of an enterprise application. Corresponding with the role-based aspects of the present disclosure, the invoking (e.g., at a future moment) applies a second validation using the security model to allow/deny the act of launching the enterprise application task interface (see operation 1C60).

Figure 1D:
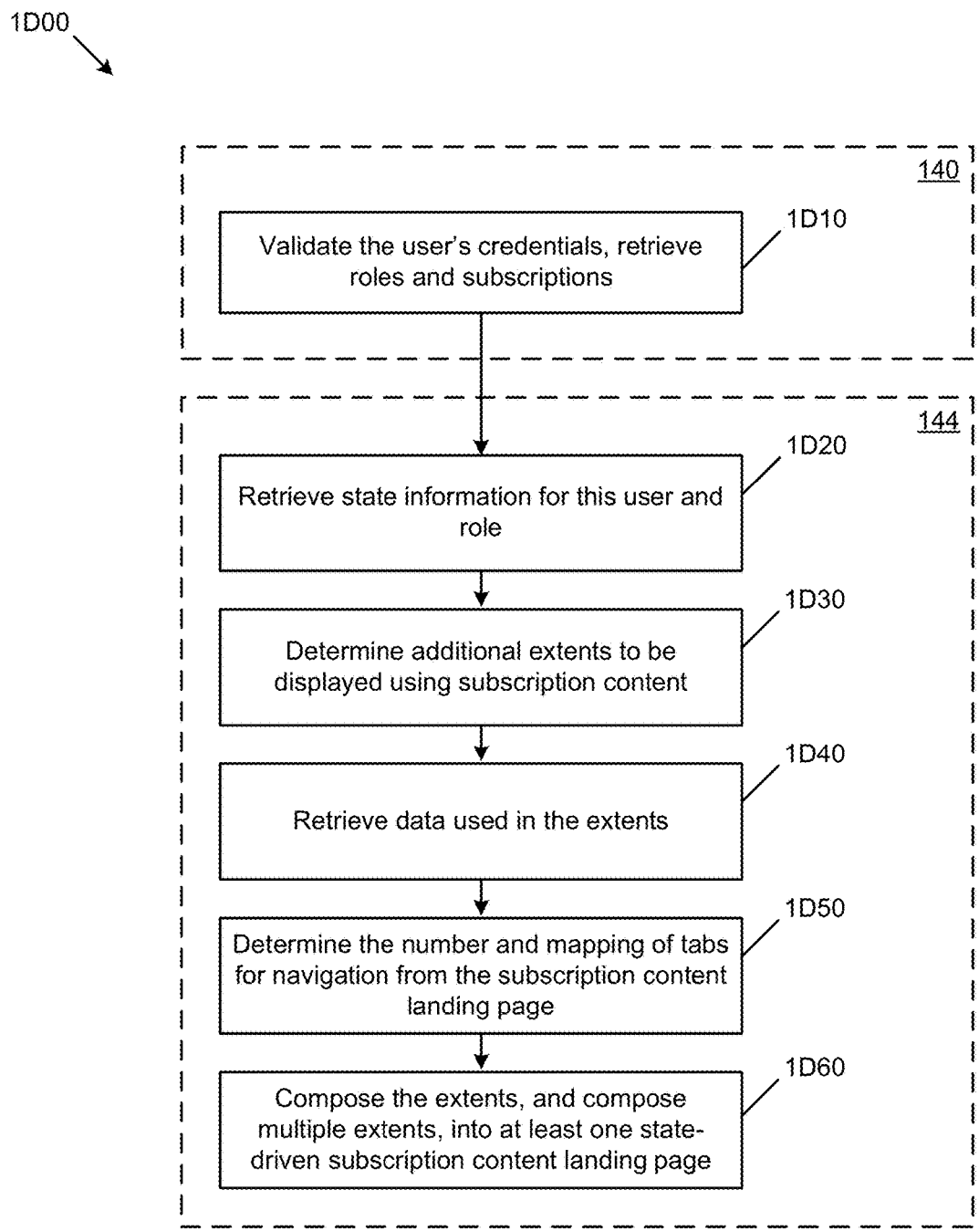
FIG. 1D is a flow chart of a system for generating state-driven role-based landing pages, according to some embodiments.

FIG. 1D is a flow chart of a system 1D00 for generating state-driven role-based landing pages. As an option, the present system 1D00 may be implemented in the context of the architecture and functionality of the embodiments described herein. Also, the system 1D00 or any aspect therein may be implemented in any desired environment.

As shown, validation steps 140 comprise one or more operations to validate the user's credentials, retrieve the user's roles (e.g., role credentials), and retrieve the user's subscriptions (see operation 1D10 and see row 1B02 of FIG. 1B). Once such validation steps 140 have been deemed successful (e.g., the case of a successful enterprise application user login event), processing proceeds to further steps for generating state-driven role-based landing pages.

Now, having validated the user and retrieving the user's subscriptions, the system 1D00 commences the compositor operations 144. More specifically, the system 1A00 can correlate a user or a user's role in order to retrieve state information (see operation 1D20). The state information can comprise any of a variety of state markers that capture the state of a previous session, or the state of an application run based on previous invocation, or one or more states and/or statuses that capture the user's progression through tasks, and/or or one or more states and/or statuses that capture the user's progression through a task model (see FIG. 3A).

Such a determination of state information is used to determine the nature of task results or reports or extents to be displayed (see operation 1D30). For example if a task model called for updating the inventory report every three days, and the most recently saved state indicated an update of the inventory report just one day earlier, then that extent might not be subjected to a re-running of the report. Or, it might be possible that an extent corresponding to some external content had been retrieved and cached (e.g., within a cache), in which case it might be unnecessary to update that extent from the external locations; instead, the extent can be retrieved (e.g., using the cached copy) and composited into a display container. In the foregoing and other cases, the system 1D00 serves to retrieve data used in the extents (see operation 1D40).

It can happen that the content of a subscription can grow large, or it is possible that a user, in some role, subscribes to many extents to be retrieved and composited. Thus processing of compositor operations 144 can layout landing pages that include a plurality of tabs within the display container. The determination of the number and mapping of tabs to extents can be performed dynamically, that is, re-compositing whenever the compositor operations 144 are invoked (see operation 1D50). In some cases, the extents may be retrieved via web portals or portlets, and/or via running an application (with or without a subscription wrapper), and the display container can be organized for ease of navigation, possibly including use of dynamic sizing techniques, determination of front page versus overflow containers, use of scrolling regions, use of hidden tabs and navigations arrows, etc. A web portlet can serve to invoke an application of any sort. A web portlet can be used in conjunction with a subscription wrapper.

In some cases, all of the extents may have changed since the previous compositor operations, and in some cases, only some (or few or none) of the extents may have changed since the previous compositor operations. In any of these cases, the landing page or pages are dynamically updated (see operation 1D60) on the basis of the persisted state (e.g., using one or more state markers 147). The persisted state(s) can be store in any convenient location, possibly within application storage $131_0$, or within application storage $131_1$ and/or in a cache.

Figure 1E:
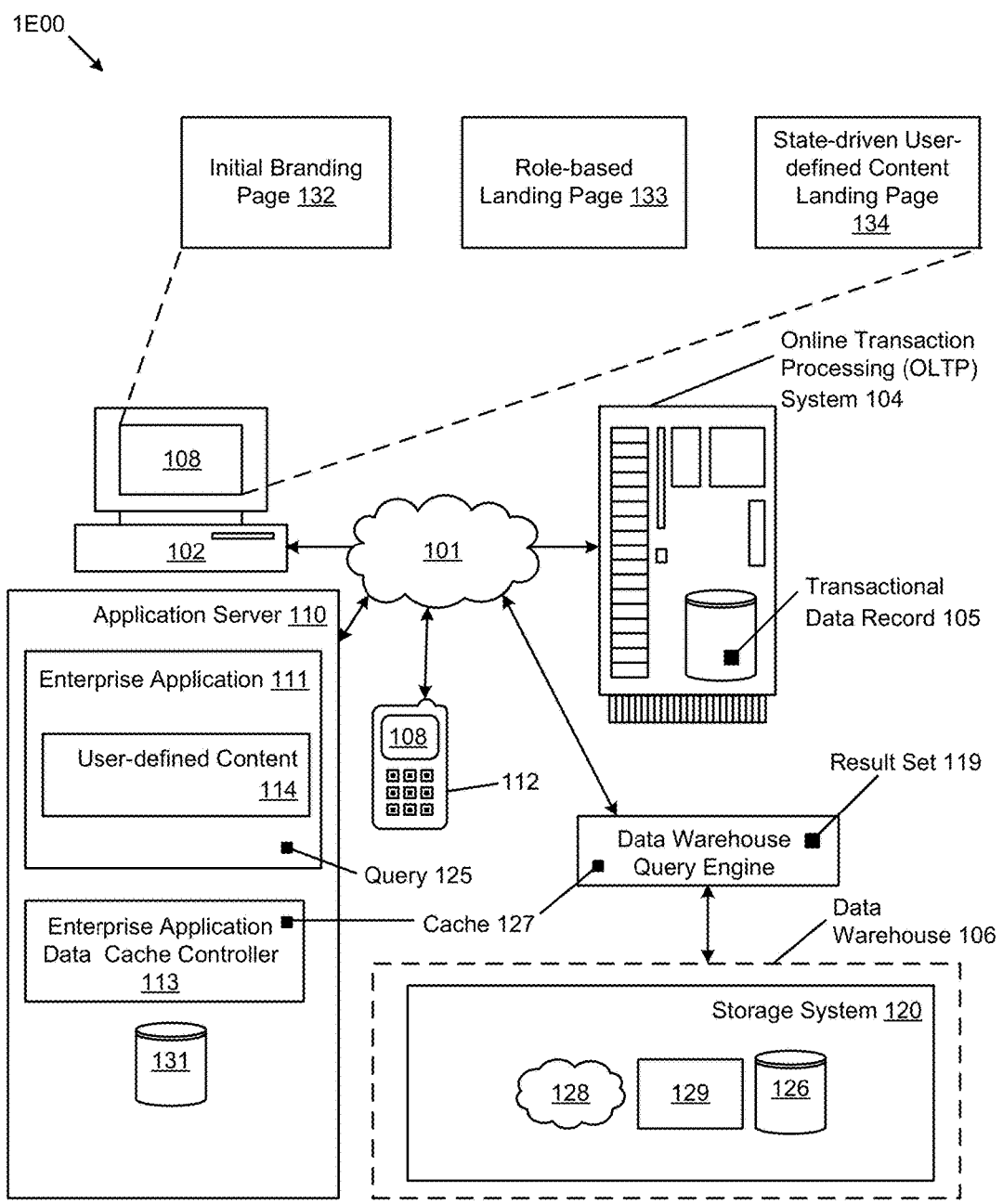
FIG. 1E is an environment for enterprise applications capable of generating state-driven role-based landing pages, according to some embodiments.

FIG. 1E is an environment 1E00 for enterprise applications capable of generating state-driven role-based landing pages. As an option, the present environment 1E00 may be implemented in the context of the architecture and functionality of the embodiments described herein. Also, the environment 1E00 or any aspect therein may be implemented in any desired environment.

In an enterprise application environment, business people desire up-to-the-minute transaction information, as well as historical data. In some cases, analysis of data, especially analysis of vast amounts of historical data, can become computationally intensive. In some environments, in particular environments suited for generating state-driven role-based landing pages, it is possible that analysis of vast amounts of historical data are computed using data from a data warehouse. In one possible scenario, data from a data warehouse is periodically extracted, analyzed, summarized, and stored in application storage 131 in pre-computed forms for later use. In some other cases, the pre-computed data is stored in a cache for subsequent and possibly repeated quick access to such pre-computed data.

As shown, environment 1E00 includes an online transaction processing system 104, a data warehouse 106, a network 101 (e.g., a WAN or LAN or an intranet or the Internet), and several user terminals (e.g., user terminal 102 and mobile device 112). Also shown is an application server 110, which application server is configured to generate state-driven role-based landing pages, which state-driven role-based landing pages are stored in volatile or non-volatile storage, and can be rendered (e.g., on a display surface 108) as a landing page (e.g., initial branding page 132, role-based landing page 133, state-driven user-defined content landing page 134).

According to exemplary embodiments, the rendering of a landing page on the display surface includes a display of landing pages that present up-to-the-minute transaction information, and can further display historical data and/or relate historical data to the up-to-the-minute transaction information, using a landing page.

In preparing the aforementioned landing pages, one or more OLTP systems serve for retrieving one or more transactional data records 105. Contemporaneously, other systems serve for retrieving historical data via a data warehouse query engine using a query 125 to a data warehouse 106 (e.g., via storage system 120), the historical data comprising one or more instances of a historical enterprise (e.g., quarterly costs, etc.). In exemplary embodiments, execution of such a query 125 returns a result set 119, and the query 125 can be received from a user profile, possibly in the form of a formatted instance of a subscription query representing one or more subscriptions (e.g., Query1, Query2, etc.).

In some embodiments, the system commences further processing (e.g., in an application server 110) of one or more instances of enterprise application 111. For example, the enterprise application prepares forms of user-defined content 114 (e.g., subscription content, etc.) by combining one or more "Cost" data items from the historical data with one or more "Cost" data items from the up-to-the-minute transaction information, and then formatting the display content into a format suitable to be processed into a container on a landing page.

Moreover, for addressing the need by certain roles (e.g., people who very frequently travel), an application server can be configured to reformat the subscription content so as to display conveniently on a smaller screen (e.g., display surface 108) of a mobile device 112. In fact, an application server can perform as a web server and serve landing pages that include subscription content to a mobile device by transmitting the reformatted subscription content to the mobile device.

As previously mentioned, in certain cases, pre-computed data is stored in a cache for subsequent (and possibly repeated) quick access to such pre-computed data. Such caching can be extended to include any variety or format or combination of data. Moreover, aspects of the user's state (e.g., date and time of last access) can be stored for later access. For example, an application server 110 can be configured to implement intermediate storage comprising a cache (e.g., using an enterprise application data cache controller 113), and such a cache can be used to store any sorts of data, including any portions of the aforementioned pre-computed data, and/or any reports of user states and/or subscription content. In fact, and as shown, enterprise application data cache controller 113 can serve to recognize any stored data as data that has a likelihood of repeated retrieval (e.g., daily subscription content for viewing by multiple field sales people), and stores such data in non-volatile application storage (e.g., application storage 131) for such repeated retrieval. In some cases there is a sufficient volume of data that has a likelihood of repeated retrieval that an application server 110 manages a local cache for fast retrieval.

In another embodiment involving caching, a user might want a report that includes up-to-the-minute data (e.g., while watching updated bids in an auction), yet in other situations the user might want a report that includes moderately recent transaction data, especially transaction data that has not yet been (as of that point in time) stored in a data warehouse (e.g., the results of yesterday's auctions). In the latter case, a report that includes transaction data can be compiled using a cache, where the cache is used to store any one or more transactional data records data that have not yet been stored in the storage system of a data warehouse. And, such a report can be published as a subscription, and can be accessed as subscription content. A subscription query or subscription wrapper can invoke, or cause to be invoked, any one or more enterprise application(s) to run, and the enterprise application can be run using aspects of the user state in its run configuration setup or in its input or output specifications.

In addition to uses of a cache or caches for the purposes heretofore described, the cache can also be used for managing latency of access to persistent storage. For example, persistent storage can be formed by descriptions stored within files (e.g., in a file system found on storage device 126), or within relations (e.g., within a relational database 129), or can be formed of data retrieved via a network or cloud 128.

Figure 2A:
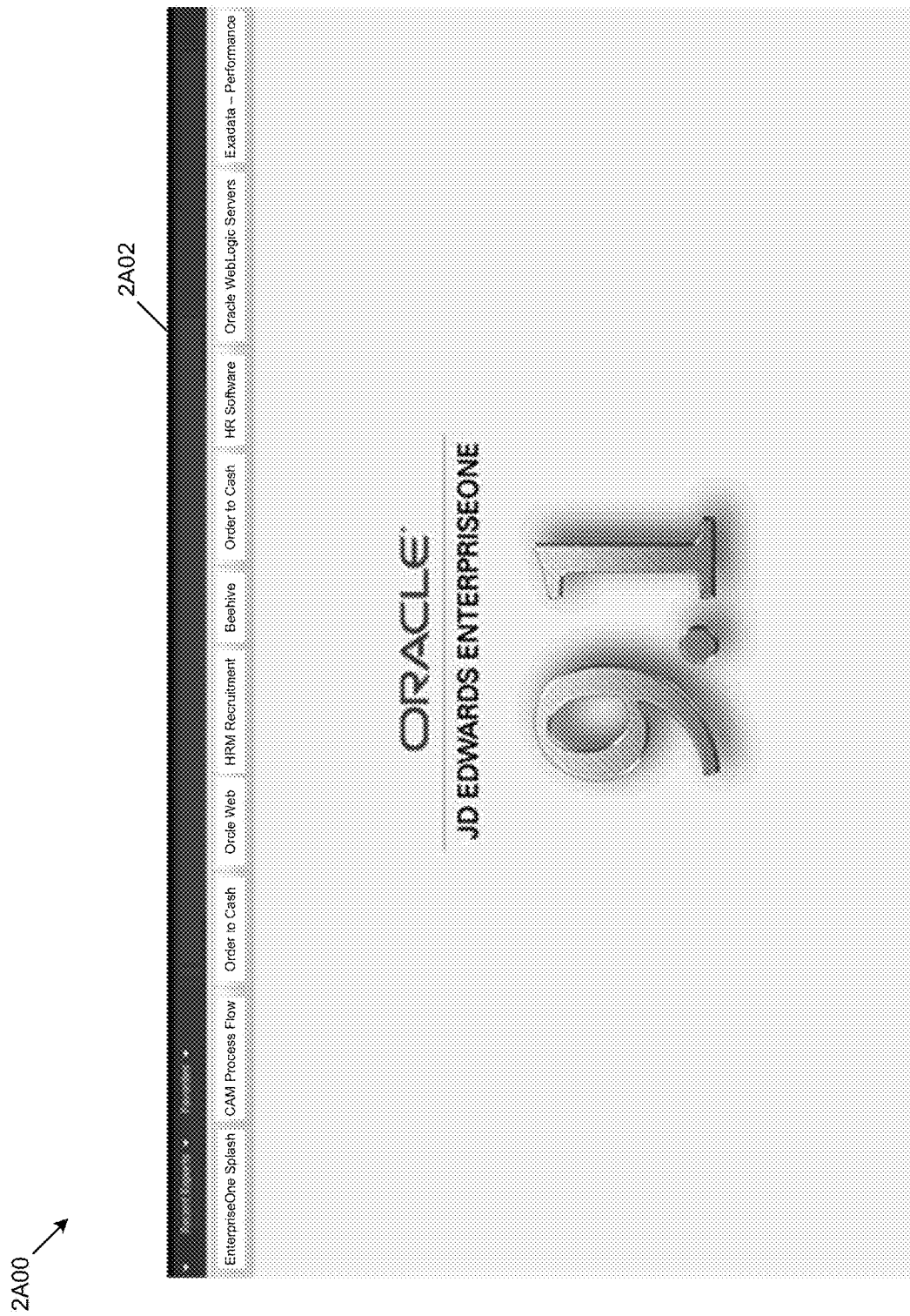
FIG. 2A illustrates an initial branding page used in enterprise applications capable of generating state-driven role-based landing pages, according to some embodiments.

FIG. 2A illustrates an initial branding page 2A00 used in enterprise applications capable of generating state-driven role-based landing pages. As an option, the present initial branding page 2A00 may be implemented in the context of the architecture and functionality of the embodiments described herein. Also, the initial branding page 2A00 or any aspect therein may be implemented in any desired environment.

As shown, a branding landing page can display a look and feel and/or text and/or images that are suggestive to the brand. In some embodiments, the display of the initial landing page can include a simplified banner 2A02, and the initial landing page can persist on the screen for some time duration while the enterprise system performs additional steps. For example, the enterprise system might retrieve home content (e.g., from user-defined content found in files located in a home directory named by a link, path, URL, or URI).

Figure 2B:
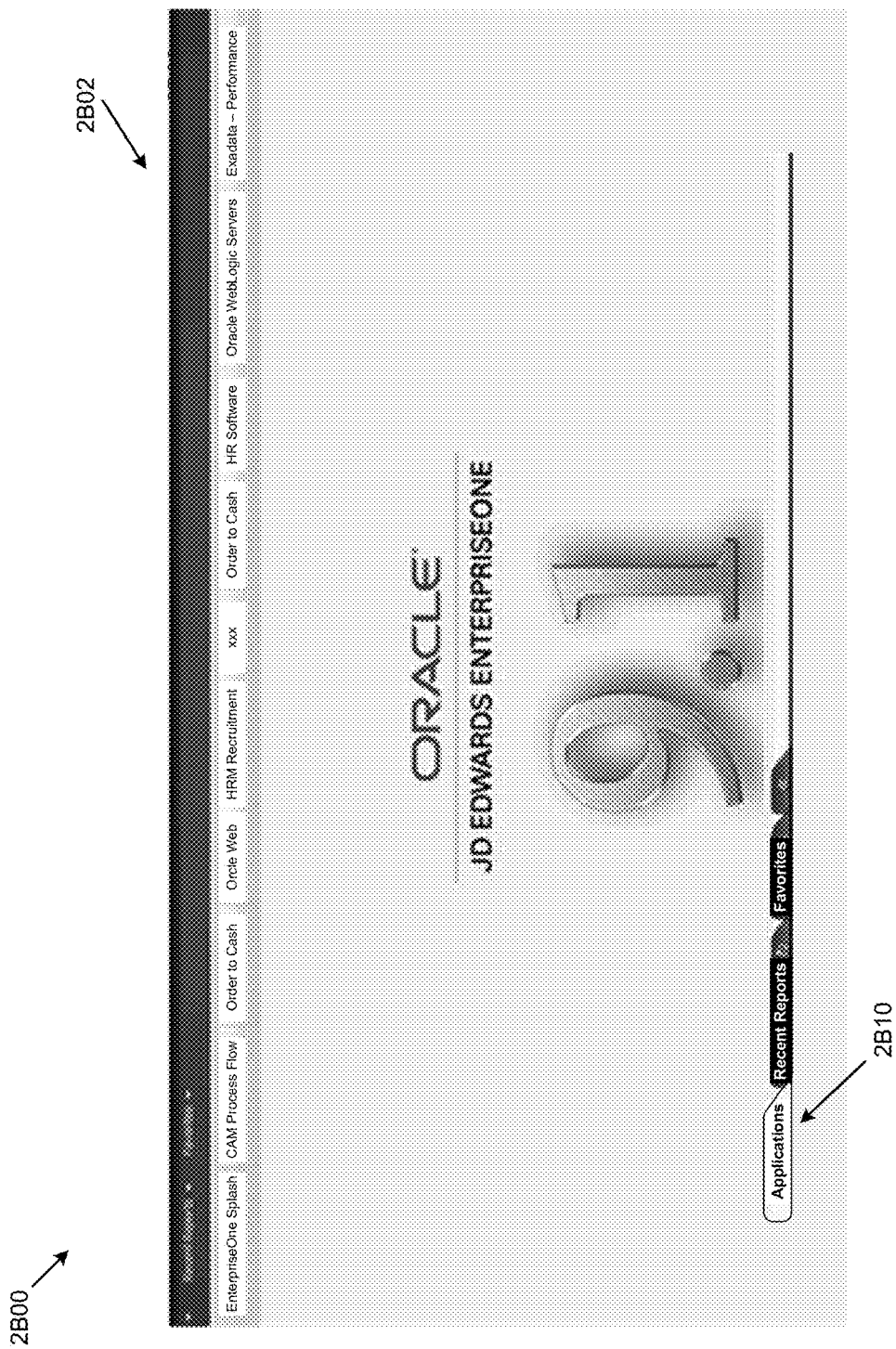
FIG. 2B illustrates a role-based landing page used in enterprise applications capable of generating state-driven role-based landing pages, according to some embodiments.

FIG. 2B illustrates a role-based landing page 2B00 used in enterprise applications capable of generating state-driven role-based landing pages. As an option, the present role-based landing page 2B00 may be implemented in the context of the architecture and functionality of the embodiments described herein. Also, the role-based landing page 2B00 or any aspect therein may be implemented in any desired environment.

As shown, the role-based landing page includes a role-based banner 2B02, which landing page includes tabs 2B10 that are determined based on the user's role. In this example, the role-based banner includes a set of menu items applicable to a user having the role of "Sales Engineer". That is, the role-based banner includes a large set of menu items that pertain to products that are supported by the particular logged-in sales engineer, and the tabs showing within the container are determined based on the user's role.

Figure 3A:
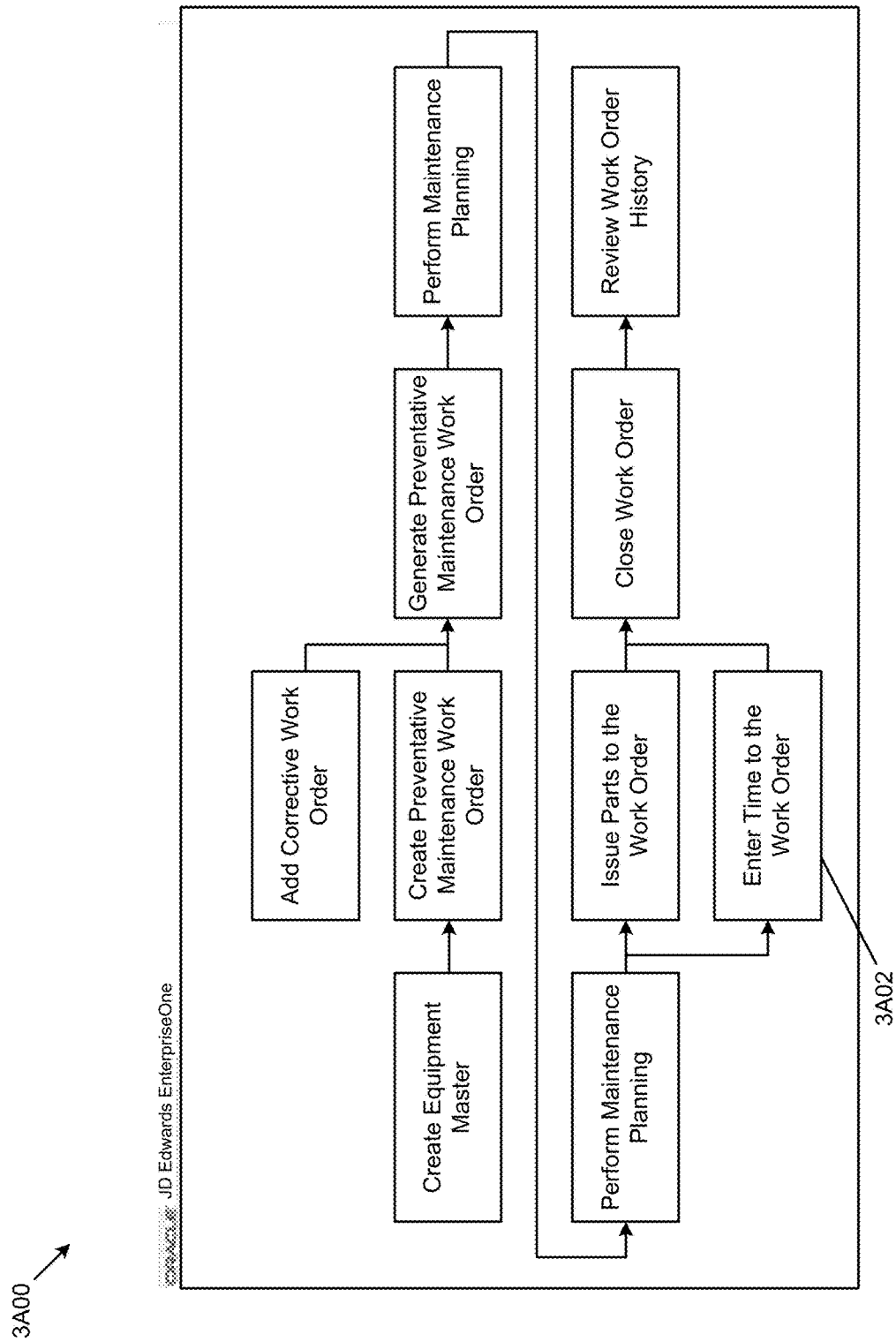
FIG. 3A illustrates a state-driven subscription content landing page using a state marker in a task-driven process chart, according to some embodiments.

FIG. 3A illustrates a state-driven user-defined content landing page 3A00 using a state marker in a task-driven process chart. As an option, the present state-driven user-defined content landing page 3A00 may be implemented in the context of the architecture and functionality of the embodiments described herein. Also, the state-driven user-defined content landing page 3A00 or any aspect therein may be implemented in any desired environment.

As earlier described, it is possible that a landing page can be constructed so as to indicate a business flow or other business process imagery and the user's state (e.g., progress) through the business flow can be indicated graphically. As shown, the state-driven user-defined content landing page 3A00 is presented in the exemplary embodiment of a business flow graphic, and the user's state is indicated graphically (see last state marker 3A02).

In exemplary embodiments, a role comprises certain tasks, any of which tasks may progress in a sequence or flow, and the progression through a sequence or flow can be codified in a task model 146, and in turn displayed in a graphic such as is shown in FIG. 3A. The user's progression through the task flow can be monitored, and any specific progression, and/or events, and/or states can be persisted (e.g., using a state marker 147). Display of such monitored events or states can in turn be displayed (as shown), or can be used in combination with subscribed-to content when generating state-driven role-based landing pages.

Figure 3B:
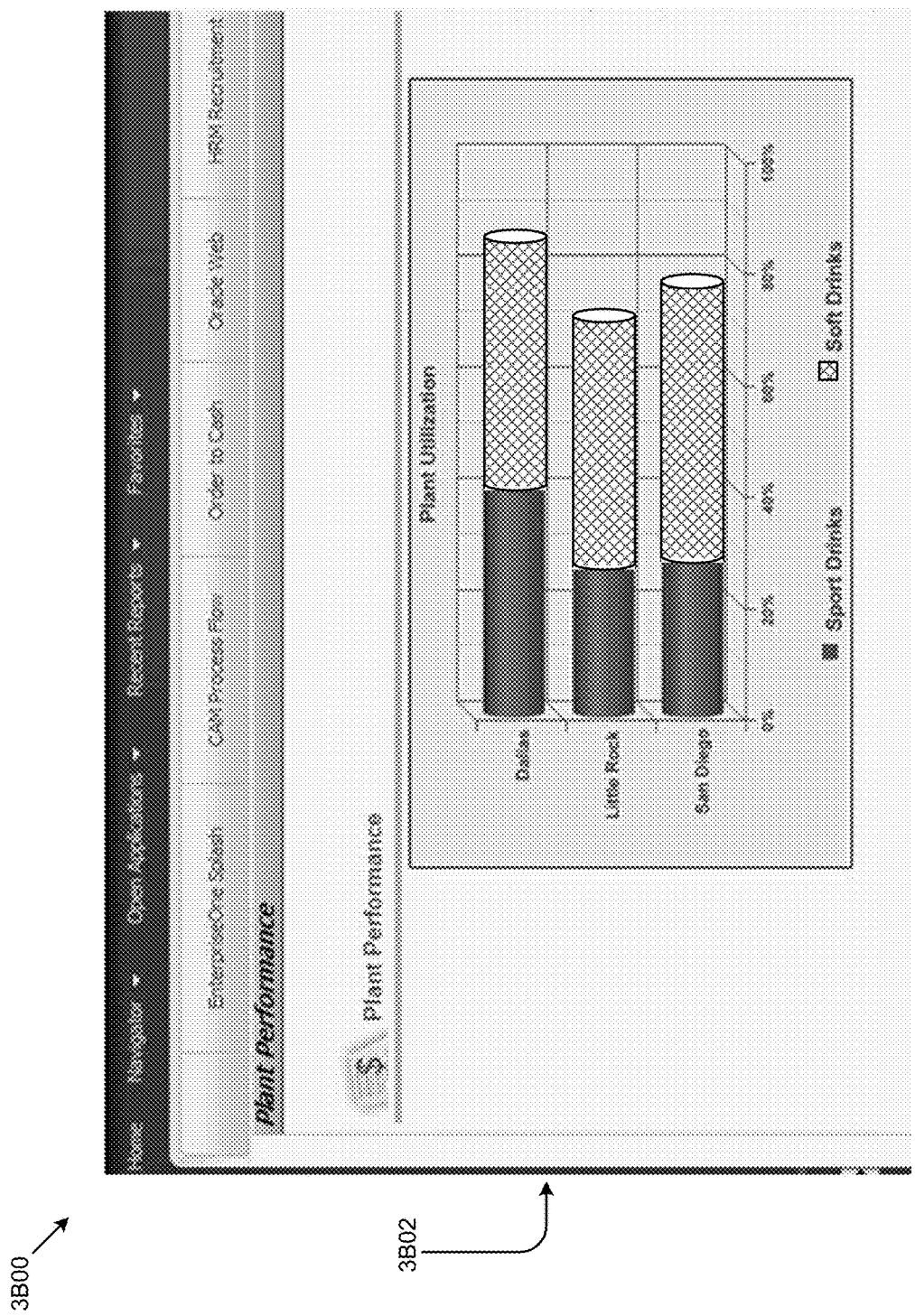
FIG. 3B illustrates a state-driven subscription content landing page using dynamically-updated subscription content, according to some embodiments.

FIG. 3B illustrates a state-driven subscription content landing page 3B00 using dynamically-updated subscription content as output from a module within a system for generating state-driven role-based landing pages. As an option, the present state-driven subscription content landing page 3B00 may be implemented in the context of the architecture and functionality of the embodiments described herein. Also, the state-driven subscription content landing page 3B00 or any aspect therein may be implemented in any desired environment.

The dynamically-updated subscription content 3B02 includes a subscription to a data item within the "plant performance" module, specifically the data item "Plant Utilization", shown as a bar chart covering "Dallas", "Little Rock", and "San Diego". The subscription content is an example of role-based content corresponding to the role of "Plant Manager", and the up-to-the-minute data needed by a plant manager might include up-to-the-minute content (e.g., the depicted "Plant Utilization" chart).

Figure 3C:
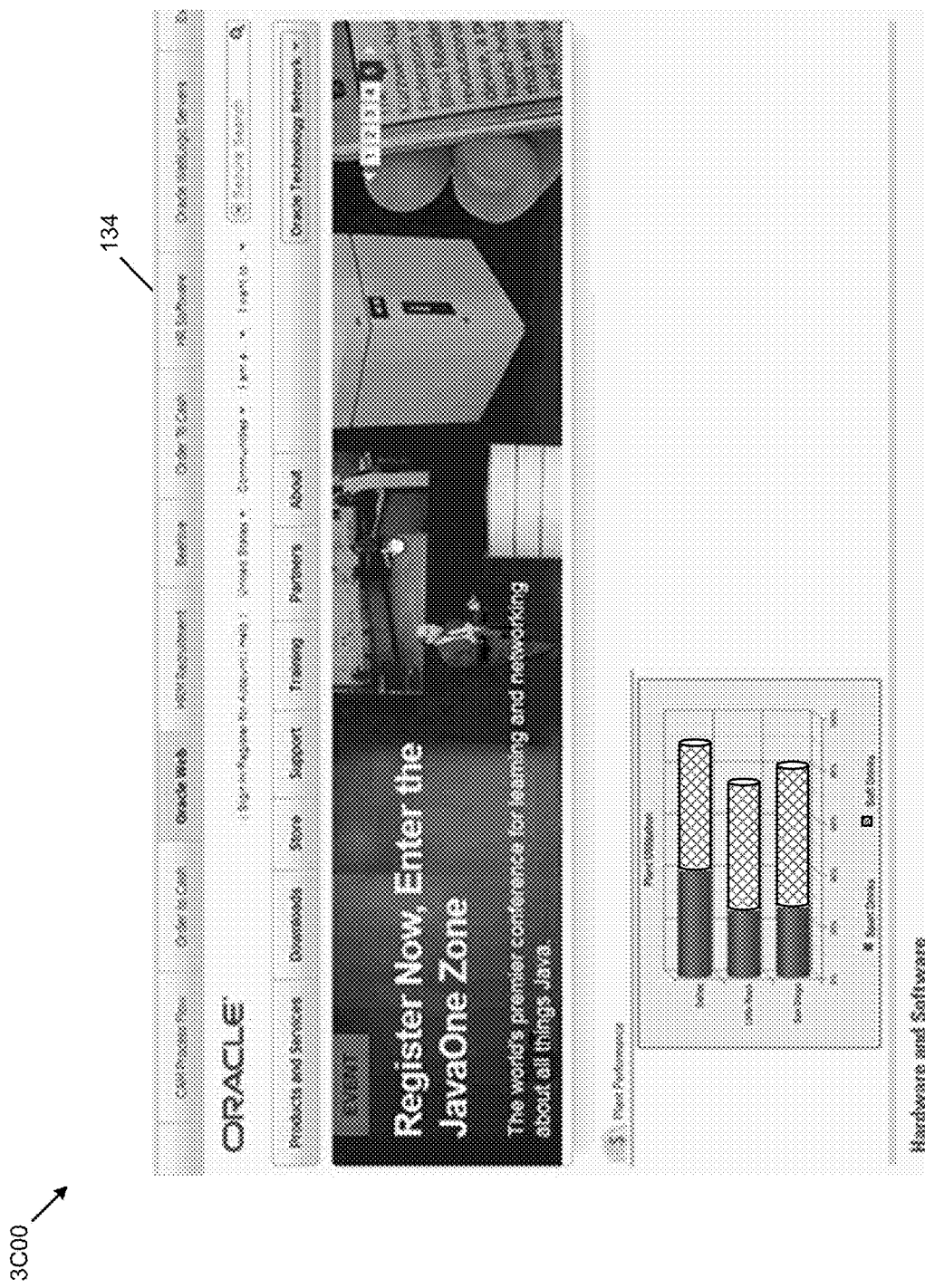
FIG. 3C illustrates a state-driven subscription content landing page in the form of a display container using externally-sourced subscription content, according to some embodiments.

FIG. 3C illustrates a state-driven subscription content landing page in the form of a web page using externally-sourced subscription content 3C00 as output from a module within a system for generating state-driven role-based landing pages. As an option, the present state-driven user-defined content landing page 134 may be implemented in the context of the architecture and functionality of the embodiments described herein.

In some embodiments, it is possible that a landing page can be constructed so as to display content that is retrieved via a web address, or via any content accessible via a URL. And it is possible that a landing page can be constructed so as display content that is retrieved via an external enterprise application or web service. In such cases, the framework can retrieve externally-sourced subscription content from the external location or external locations and use the retrieved subscription content in a state-driven subscription content landing page.

Such a state-driven subscription content landing page in the form of a web page using externally-sourced subscription content 3C00 can also include user-specific and/or role-specific content. As shown, the state-driven subscription content landing page can include both externally-sourced subscription content (e.g., the event flyer, as shown) as well as user- and/or role-specific state-driven subscription content (e.g., the up-to-the-minute content in the "Plant Utilization" chart, as shown).

In some embodiments, a landing page can animate in from one side or the other based on the physical location of an item on the display surface. The content of the containers (e.g., iframe containers within a master container) can be loaded and updated on demand and can be cached. Embodiments can retrieve data from the enterprise application and use the retrieved data in the presentation of content (e.g., user-specific content). The data composited to satisfy a first demand can be different from the data composited upon a later demand.

Also, a container can collapse the tabs (e.g., for conserving display surface real estate) and the tabs can be rearranged (e.g., by a user to accommodate user preference considerations). The framework can maintain the state of a window or of a container for a user across sessions. When the user leaves and re-enters the application, the state can be restored and the display returns to an appearance as it was when last accessed. Additionally, while logged into the application, the state can be persisted for the user.

In some embodiments, a user can specify a plurality of subscriptions and the respective plurality of user states can be persisted on behalf of the user. That is, after validating and identifying the user role or roles, embodiments can then identify any number of subscriptions where each of the respective subscriptions has a corresponding user state. Having multiple subscriptions and multiple states, then a landing page such as depicted in FIG. 3C can be formed by populating display containers, each having subscription content based on the respective state.

Additional Embodiments of the Disclosure

Figure 4:
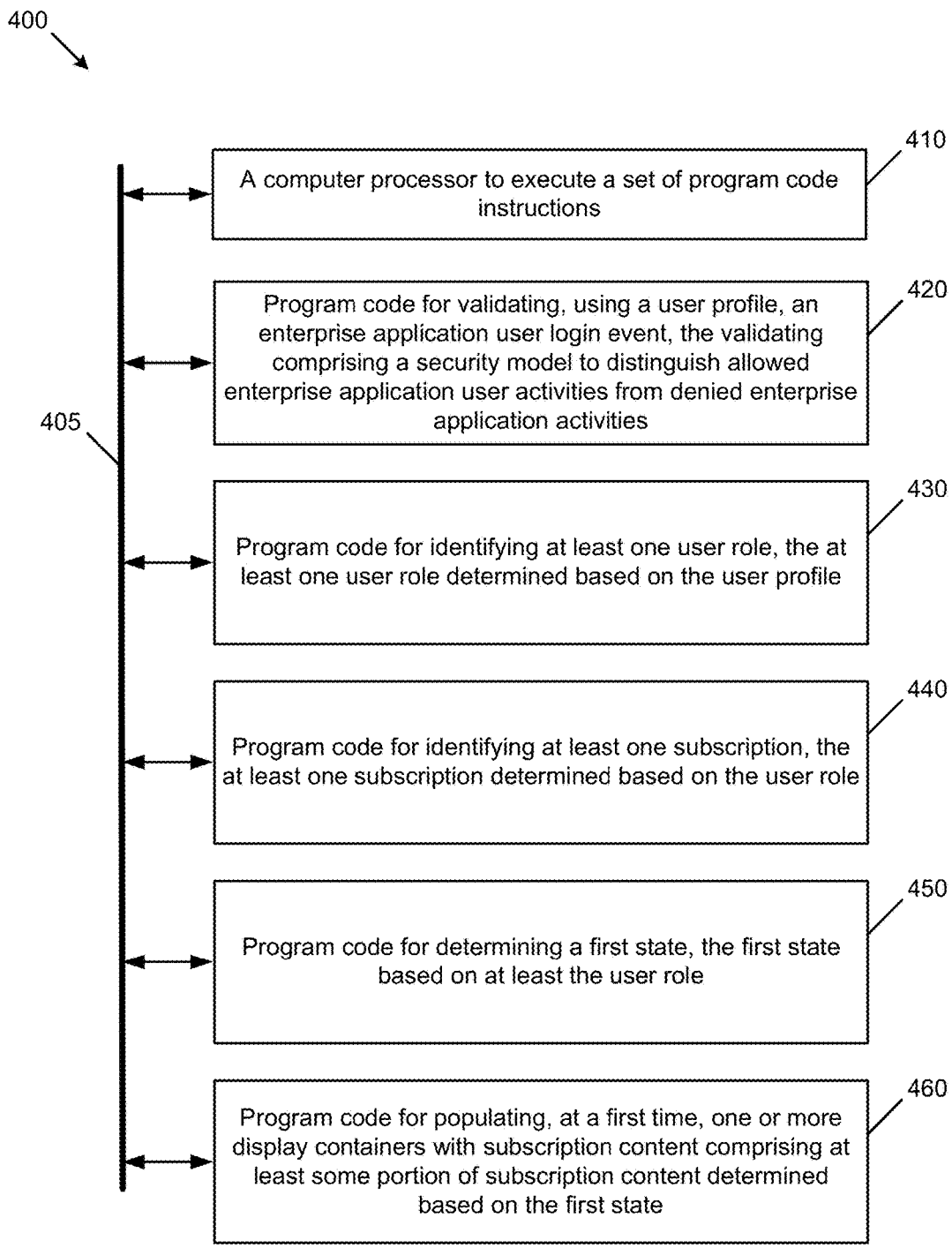
FIG. 4 depicts a block diagram of a system to perform certain functions of a computer system for generating state-driven role-based landing pages, according to some embodiments.

FIG. 4 depicts a block diagram of a system to perform certain functions of a computer system for generating state-driven subscription-based landing pages. As an option, the present system 400 may be implemented in the context of the architecture and functionality of the embodiments described herein. Of course, however, the system 400 or any operation therein may be carried out in any desired environment. As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims. The embodiment of FIG. 4 implements a portion of a computer system, shown as system 400, comprising a computer processor to execute a set of program code instructions (see module 410) and modules for accessing memory to hold program code instructions to perform: validating, using a user profile, an enterprise application user login event, the validating comprising a security model to distinguish allowed enterprise application user activities from denied enterprise application activities (see module 420); identifying at least one user role, the at least one user role determined based at least in part on the user profile (see module 430); identifying at least one subscription, the at least one subscription determined based at least in part on the at least one user role (see module 440); determining a first state, the first state based on at least the at least one user role (see module 450); and populating, at a first time, one or more display containers with subscription content comprising at least some portion of subscription content determined based on the first state (see module 460).

System Architecture Overview

Figure 5:
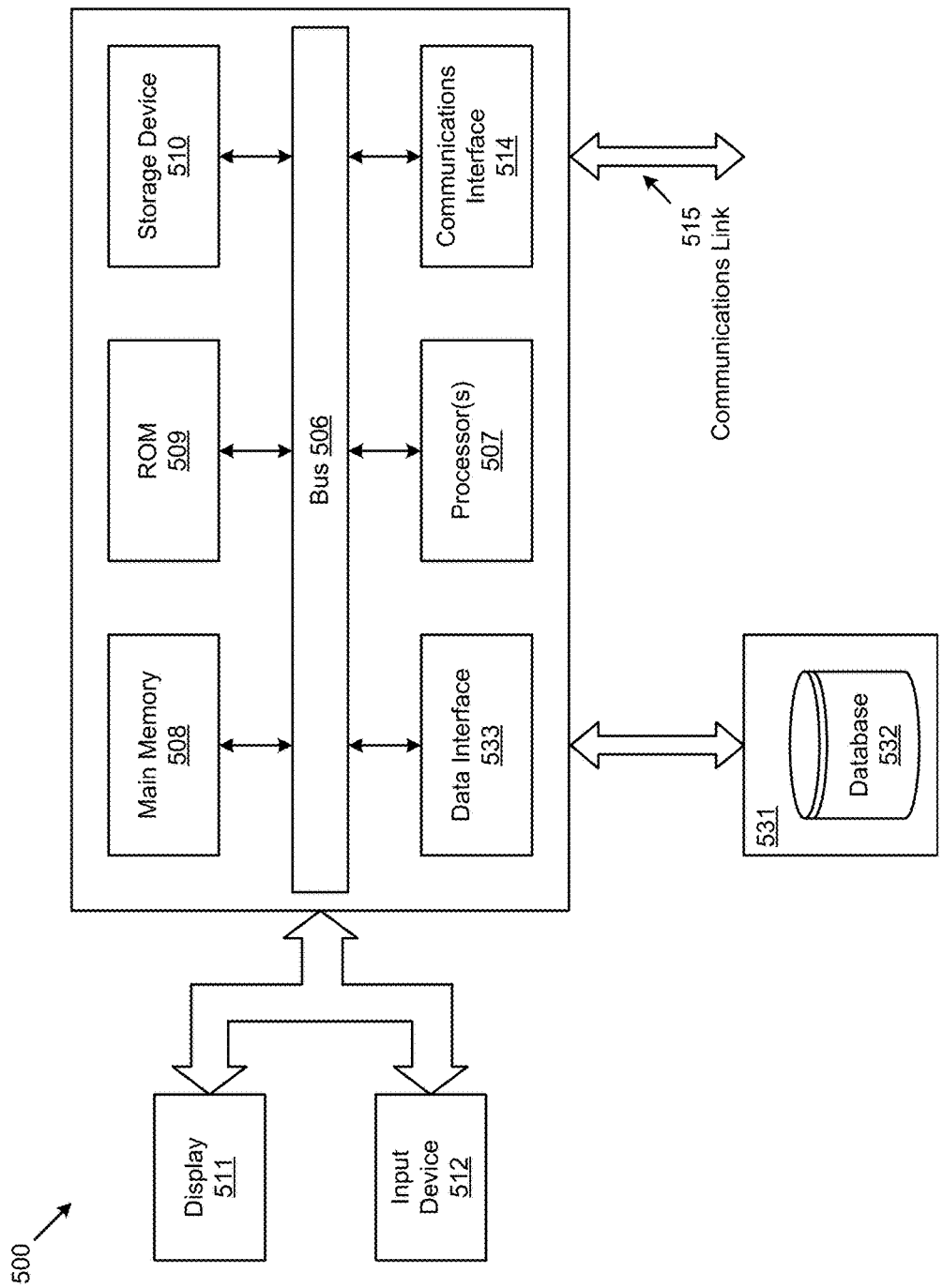
FIG. 5 depicts a block diagram of an instance of a computer system suitable for implementing an embodiment of the present disclosure.

FIG. 5 depicts a block diagram of an instance of a computer system 500 suitable for implementing an embodiment of the present disclosure. Computer system 500 includes a bus 506 or other communication mechanism for communicating information, which interconnects subsystems and devices, such as a processor 507, a system memory 508 (e.g., RAM), a static storage device 509 (e.g., ROM), a disk drive 510 (e.g., magnetic or optical), a data interface 533, a communication interface 514 (e.g., modem or Ethernet card), a display 511 (e.g., CRT or LCD), input devices 512 (e.g., keyboard, cursor control), and an external data repository 531.

According to one embodiment of the disclosure, computer system 500 performs specific operations by processor 507 executing one or more sequences of one or more instructions contained in system memory 508. Such instructions may be read into system memory 508 from another computer readable/usable medium, such as a static storage device 509 or a disk drive 510. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 500. According to other embodiments of the disclosure, two or more computer systems 500 coupled by a communication link 515 (e.g., LAN, PTSN, or wireless network) may perform the sequence of instructions required to practice the disclosure in coordination with one another.

Computer system 500 may transmit and receive messages, data, and instructions, including programs (e.g., application code), through communication link 515 and communication interface 514. Received program code may be executed by processor 507 as it is received, and/or stored in disk drive 510 or other non-volatile storage for later execution. Computer system 500 may communicate through a data interface 533 to a database 532 on an external data repository 531. A module as used herein can be implemented using any mix of any portions of the system memory 508, and any extent of hard-wired circuitry including hard-wired circuitry embodied as a processor 507.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for presenting landing pages to a user within an enterprise software application having a security model that supports both user credentials and role credentials, the method comprising:
    validating, using the security model, an enterprise software application user login event for a user of a plurality of users accessing the enterprise software application;
    identifying, by a computer, at least one user role that is determined for the user based at least in part on the security model;
    determining role-specific content based at least in part upon the at least one user role of the user;
    determining user-specific content that is specific to the user based at least in part upon a link that is provided by the user and pointing to the user-specific content;
    presenting the user-specific content in addition to the role-specific content in a landing page to the user;
    accepting a user indication from within the landing page to invoke launching of an enterprise application task interface;
    determining whether the launching of the enterprise task interface is allowed or denied at least by validating the launching of the enterprise application task interface with at least the security model and a role credential associated with the at least one user role
    monitoring a user's progression through tasks associated with the at least one user role and retrieving updated user-defined content; and
    composing user-defined display containers using the updated user-defined content to include in the landing page.

2. The method of claim 1, further providing a user-defined content specification module, the module to add a user-specified HTML, content item to the landing page for later presentation of the user-specified HTML content item.

3. The method of claim 1, further providing operations to upload, test, approve, activate, and publish the landing page.

4. The method of claim 1, wherein the presentation of the landing page comprises user-specified content published to a content repository and a URL that is external to a network domain of a host of the enterprise software application.

5. The method of claim 1, further comprising:
    validating the user by using at least the security model and a login credential of the user;
    generating a data structure for storing user profiles of a plurality of users and storing the data structure in a non-transitory computer accessible storage medium;
    identifying a role column storing a plurality of roles for a plurality of users for the enterprise software application in the data structure;
    identifying an environment column storing a plurality of pieces of environment information for each role in the role column for the plurality of users for the enterprise software application in the data structure;
    identifying a subscription column storing one or more subscription identifiers for the each role in the role column for the plurality of users for the enterprise software application in the data structure;
    identifying a user-defined content column storing one or more uniform resource locators or one or more uniform resource identifiers for the each role in the role column for the plurality of users for the enterprise software application in the data structure;
    identifying a state variable column storing one or more state variables for the each role in the role column for the plurality of users for the enterprise software application in the data structure;
    after the enterprise software user login event is validated, retrieving a user profile uniquely identifying the user from a relational database by using at least the security model and the login credential of the user, the user profile associated with multiple roles in the role column of the data structure, a user identifier for the user, and the enterprise software application;
    presenting an initial presentation of the landing page to the user;
    receiving an invocation that invokes the launching of the enterprise application task interface from the user for the enterprise software application;
    identifying at least one or more state values corresponding to the one or more state variables and the environment information from the environment column from the data structure based at least in part upon the user profile of the user;
    identifying state-driven contents based at least in part upon the at least one or more state values for the user;
    identifying the role-specific content based at least in part upon the multiple roles located in the role column of the data structure and associated with the user profile for the user;
    presenting an updated presentation of the landing page including at least the state-driven contents and the role-specific content to the user based at least in part upon the environment information from the environment column from the data structure, the updated presentation of the landing page different from the initial presentation of the landing page;
    identifying the one or more uniform resource locators or the one or more uniform resource identifiers for the multiple roles from the user-defined content column of the data structure for the user;
    identifying the user-specific content that corresponds to the one or more uniform resource locators or the one or more uniform resource identifiers;
    determining whether the user is allowed to access the user-specific content by validating an access to the user-specific content for the user;
    retrieving the user-specific content when the access to the user-specific content is validated for the user; and
    incorporating the user-specific content in the landing page presented to the user after the access to the user-specific content is validated for the user.

6. The method of claim 1, wherein the user indication is one of a click, a touch, or a keystroke.

7. The method of claim 1, wherein the landing page comprises a presentation of a plurality of tabs within the landing page.

8. The method of claim 1, wherein the landing page comprises results of running the enterprise software application via the enterprise application task interface.

9. The method of claim 1, wherein the at least one user role comprises at least one of a database administrator, an engineer, a sales engineer, an account manager, or a data entry role.

10. A computer system for presenting landing pages to a user within an enterprise software application having a security model that supports both user credentials and role credentials, comprising:
- a computer processor to execute a set of program code instructions; and
- a memory to hold the program code instructions, in which the program code instructions comprises program code to perform operations comprising:
  - validating, using the security model, an enterprise software application user login event for the user of a plurality of users accessing the enterprise software application;
  - identifying, by a computer, at least one user role that is determined for the user based at least in part on the security model;
  - determining role-specific content based at least in part upon the at least one user role of the user;
  - determining user-specific content that is specific to the user based at least in part upon a link that is provided by the user and pointing to the user-specific content;
  - presenting the user-specific content in addition to the role-specific content in a landing page to the user;
  - accepting a user indication from within the landing page to invoke launching of an enterprise application task interface;
  - determining whether the launching of the enterprise task interface is allowed or denied at least by validating the launching of the enterprise application task interface with at least the security model and a role credential associated with the at least one user role
  - monitoring a user's progression through tasks associated with the at least one user role and retrieving updates user-defined content; and
  - composing user-defined display containers using the updated user-defined content to include in the landing page.

11. The computer system of claim 10, wherein the operations further comprise providing a user-defined content specification module, the user-defined content specification module to add a user-specified HTML, content item to the landing page for later presentation of the user-specified HTML content item.

12. The computer system of claim 10, wherein the operations further comprise providing additional operations to upload, test, approve, activate, and publish the landing page.

13. The computer system of claim 10, wherein the landing page comprises user-specified content published to a content repository.

14. The computer system of claim 10, wherein the landing page comprises a plurality of tabs within the landing page.

15. The computer system of claim 10, wherein the landing page comprises results of running the enterprise software application.

16. The computer system of claim 10, wherein the at least one user role includes one of a database administrator, an engineer, a sales engineer, an account manager, or a data entry role.

17. A computer program product embodied in a non-transitory computer readable medium having stored thereon a sequence of instructions which, when executed by a processor causes the processor to:
- validate, using the security model, an enterprise software application user login event for a user of a plurality of users accessing the enterprise software application;
- identify, by a computer, at least one user role that is determined for the user based at least in part on the security model;

determine role-specific content based at least in part upon the at least one user role of the user;
- determine user-specific content that is specific to the user based at least in part upon a link that is provided by the user and pointing to the user-specific content;
- present the user-specific content in addition to the role-specific content in a landing page to the user;
- accept a user indication from within the landing page to invoke launching of an enterprise application task interface;
- determine whether the launching of the enterprise task interface is allowed or denied at least by validating the launching of the enterprise application task interface with at least the security model and a role credential associated with the at least one user role
- monitor a user's progression through tasks associated with the at least one user role and retrieving updated user-defined content; and
- composing user-defined display containers using the updated user-defined content to include in the landing page.

18. The computer program product of claim 17, wherein the sequence of instructions, when executed by the processor, further causes the processor to provide a user-defined content specification module, the module to add a user-specified HTML, content item to landing page for later presentation of the user-specified HTML, content item.

19. The computer program product of claim 17, wherein the landing page comprises user-specified content published to a content repository.

20. The computer program product of claim 17, wherein the at least one user role includes one of a database administrator, an engineer, a sales engineer, an account manager, or a data entry role.

* * * * *

UNITED STATES PATENT AND TRADEMARK OFFICE
CERTIFICATE OF CORRECTION

PATENT NO. : 10,083,247 B2  
APPLICATION NO. : 13/459953  
DATED : September 25, 2018  
INVENTOR(S) : Brown et al.

Page 1 of 1

It is certified that error appears in the above-identified patent and that said Letters Patent is hereby corrected as shown below:

In the Specification

In Column 14, Line 55, delete "PTSN," and insert -- PSTN, --, therefor.

In the Claims

In Column 15, Line 51, in Claim 2, delete "HTML," and insert -- HTML --, therefor.

In Column 17, Line 40, in Claim 10, delete "updates" and insert -- updated --, therefor.

In Column 17, Line 48, in Claim 11, delete "HTML," and insert -- HTML --, therefor.

In Column 18, Line 47, in Claim 18, delete "HTML," and insert -- HTML --, therefor.

In Column 18, Line 48, in Claim 18, delete "HTML," and insert -- HTML --, therefor.

Signed and Sealed this  
Fourteenth Day of January, 2020

Andrei Iancu  
*Director of the United States Patent and Trademark Office*